US011422997B2

(12) United States Patent
Bonazzoli et al.

(10) Patent No.: US 11,422,997 B2
(45) Date of Patent: *Aug. 23, 2022

(54) SUPPORTING REPETITIVE OPERATIONS WITHIN AN OPERATING SYSTEM

(71) Applicant: INTERNATIONAL BUSINESS MACHINES CORPORATION, Armonk, NY (US)

(72) Inventors: Simone Bonazzoli, Castel Gandolfo (IT); Marco Borgianni, Rome (IT); Claudio Falcone, Rome (IT); Alessio Fioravanti, Rome (IT); Ilaria Gorga, Rome (IT); Giuseppe Longobardi, Castellammare di Stabia (IT); Silvano Lutri, Rome (IT); Luigi Presti, L'Aquila (IT); Paolo Salerno, Monterotondo (IT); Francesca Ziantoni, Vicovaro (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 409 days.

This patent is subject to a terminal disclaimer.

(21) Appl. No.: 16/743,807

(22) Filed: Jan. 15, 2020

(65) Prior Publication Data

US 2020/0151159 A1   May 14, 2020

Related U.S. Application Data

(63) Continuation of application No. 15/366,280, filed on Dec. 1, 2016, now Pat. No. 10,592,489.

(51) Int. Cl.
*G06F 16/00* (2019.01)
*G06F 16/22* (2019.01)
(Continued)

(52) U.S. Cl.
CPC .......... *G06F 16/2228* (2019.01); *G06F 9/451* (2018.02); *G06F 16/907* (2019.01)

(58) Field of Classification Search
CPC ..... G06F 9/451; G06F 16/2228; G06F 16/907
See application file for complete search history.

(56) References Cited

U.S. PATENT DOCUMENTS 6,802,052 B1   10/2004   Andrews
8,799,760 B2   8/2014    Proux et al.
(Continued)

OTHER PUBLICATIONS

List of IBM Patents or Patent Applications Treated as Related dated Jan. 15, 2020, 2 pages.

*Primary Examiner* — Cheryl Lewis
(74) *Attorney, Agent, or Firm* — Tutunjian & Bitetto, P.C.; Scott Dobson (57) ABSTRACT

A computer-implemented method and computer processing system are provided. The method includes identifying, by a processor, atomic operations within a sequence of data elements and metadata associated with the atomic operations. The sequence of data elements is related to an interaction between a user and a user interface of a computer system that includes the processor. The method also includes calculating, by the processor, correlation indexes from the metadata. A respective correlation index is calculated for various atomic operation groups formed from the atomic operations. The method additionally includes identifying, by the processor, a macro operation from at least one of the correlation indexes. The macro operation includes multiple correlated atomic operations from among the atomic operations identified within the sequence.

18 Claims, 8 Drawing Sheets

(51) Int. Cl.
 *G06F 9/451* (2018.01)
 *G06F 16/907* (2019.01)

(56) References Cited

U.S. PATENT DOCUMENTS

| | | | |
|---|---|---|---|
| 10,592,489 B2* | 3/2020 | Bonazzoli | G06F 16/907 |
| 2009/0327888 A1 | 12/2009 | Woolfe et al. | |
| 2014/0280132 A1* | 9/2014 | Auger | G06F 9/543 |
| | | | 707/736 |
| 2014/0289621 A1 | 9/2014 | Sivakumar et al. | |
| 2017/0083596 A1* | 3/2017 | Bhudavaram | G06F 16/51 |
| 2018/0039385 A1* | 2/2018 | Worley | G06F 9/543 |

* cited by examiner

SUPPORTING REPETITIVE OPERATIONS WITHIN AN OPERATING SYSTEM

BACKGROUND

Technical Field

The present invention relates generally to operation systems and, in particular, to supporting repetitive operations within an operating system.

Description of the Related Art

Currently, many software companies are directed to improving the user experience of a software application. To that end, a significant amount of systems exist that support a user while the user is using a software application. Typically, these supporting systems are applied on homogeneous applications or operations. For example, one such supporting system supports searching in a browser, by having the browser suggest to a user the most relevant search to the user at that specific moment.

Typically during a day, a user performs a sequence of repetitive operations on a computer that are heterogeneous and can be different from day to day. As is evident, such repetition can be onerous on the user, and result in the user losing focus and making a mistake. Thus, there is a need for improving the user experience regarding repetitive operations.

SUMMARY

According to an aspect of the present invention, a computer-implemented method is provided. The method includes identifying, by a processor, atomic operations within a sequence of data elements and metadata associated with the atomic operations. The sequence of data elements is related to an interaction between a user and a user interface of a computer system that includes the processor The method also includes calculating, by the processor, correlation indexes from the metadata. A respective correlation index is calculated for various atomic operation groups formed from the atomic operations. The method additionally includes identifying, by the processor, a macro operation from at least one of the correlation indexes. The macro operation includes multiple correlated atomic operations from among the atomic operations identified within the sequence.

According to another aspect of the present invention, a computer program product is provided for operation management. The computer program product includes comprising a computer readable storage medium having program instructions embodied therewith. The program instructions are executable by a computer to cause the computer to perform a method. The method includes identifying, by a processor of the computer, atomic operations within a sequence of data elements and metadata associated with the atomic operations. The sequence of data elements is related to an interaction between a user and a user interface of the computer. The method also includes calculating, by the processor, correlation indexes from the metadata. A respective correlation index is calculated for various atomic operation groups formed from the atomic operations. The method additionally includes identifying, by the processor, a macro operation from at least one of the correlation indexes. The macro operation includes multiple correlated atomic operations from among the atomic operations identified within the sequence.

According to yet another aspect of the present invention, a computer processing system is provided. The computer processing system includes a processor. The processor is configured to identify atomic operations within a sequence of data elements and metadata associated with the atomic operations. The sequence of data elements is related to an interaction between a user and a user interface of a computer system that includes the processor The processor is also configured to calculate correlation indexes from the metadata. A respective correlation index is calculated for various atomic operation groups formed from the atomic operations. The processor is additionally configured to identify a macro operation from at least one of the correlation indexes. The macro operation includes multiple correlated atomic operations from among the atomic operations identified within the sequence.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein.

DETAILED DESCRIPTION

The present invention is directed to supporting repetitive operations within an operating system.

The present invention provides dynamic and automatic support for a computer user. In an embodiment, the user can enable an agent that (i) registers operations performed on the operating system of the computer and (ii) detects if a repetitive sequence is present. All of the registered operations are saved, associated with meta-data and a data instance. A pattern is created when it is recognized that a list of operation is performed more than N times (where N can be configured in the agent, and can take on a user-assigned value). During the pattern creation, the metadata and instance data are compared to identify matches there between in order to identify which are the constants value and which are the variables. Responsive to a repetitive sequence of operations being detected, the agent will support the user during these (repetitive) operations by automatically performing all or part of the remaining repetitive operations.

Figure 1:
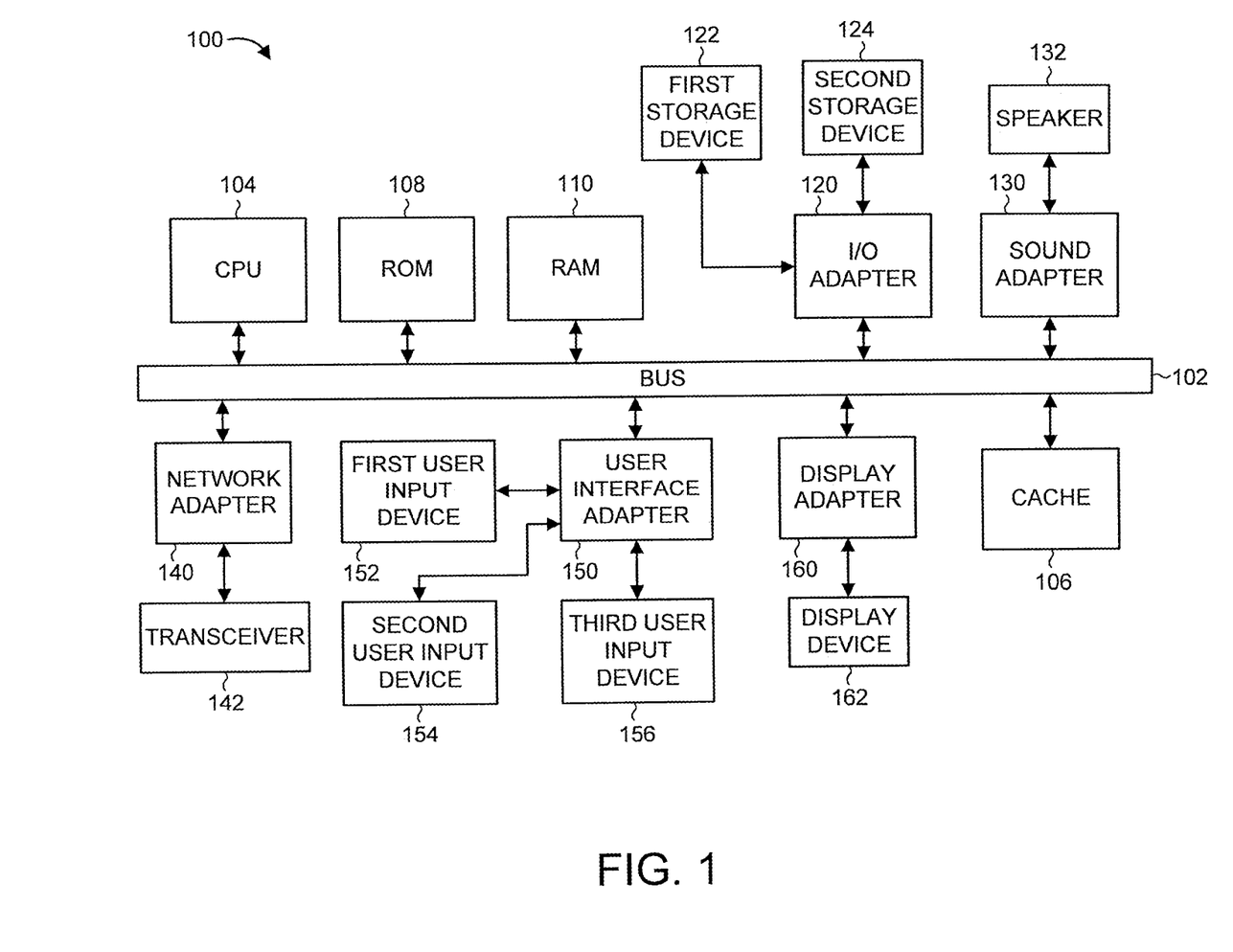
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
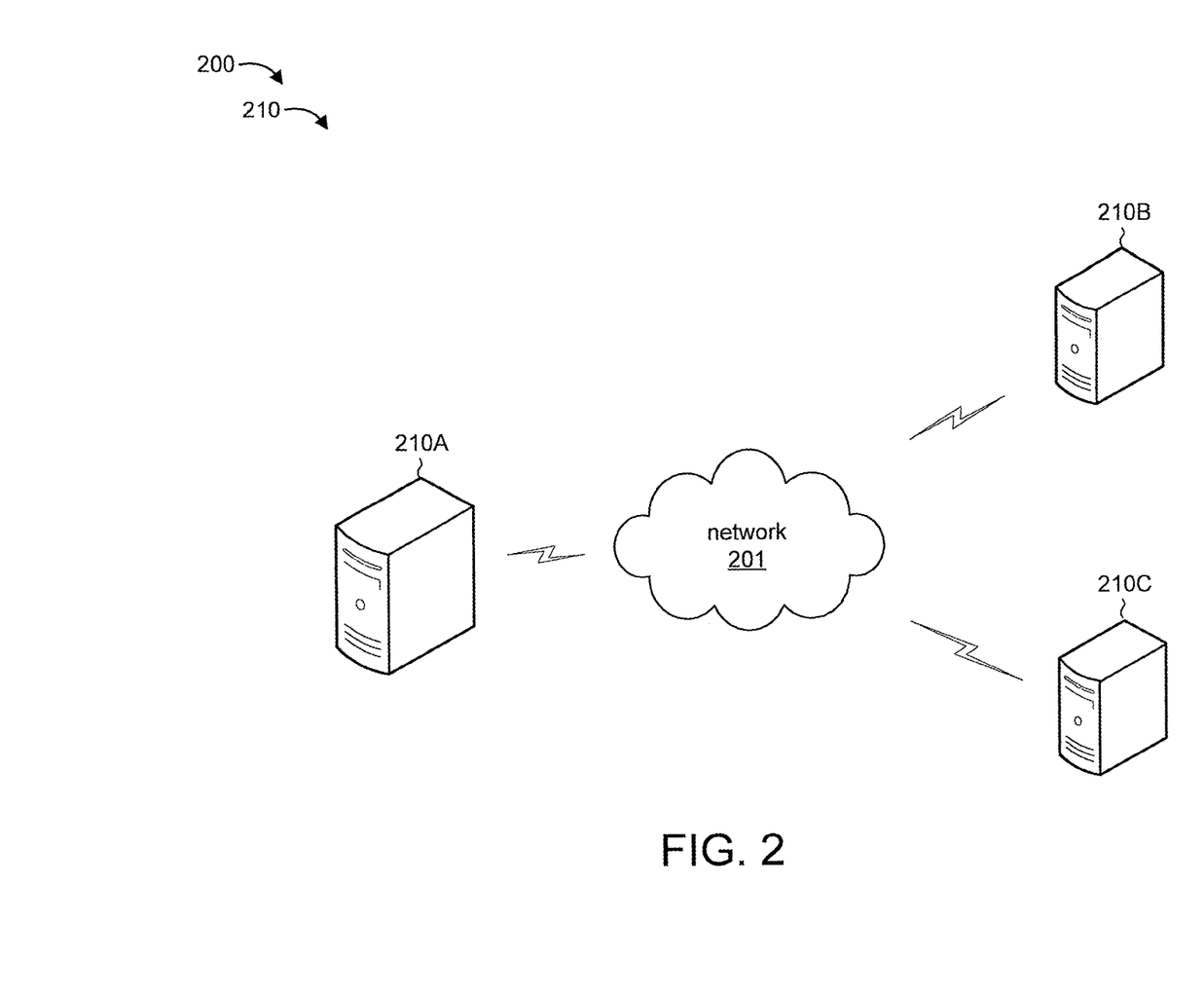
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
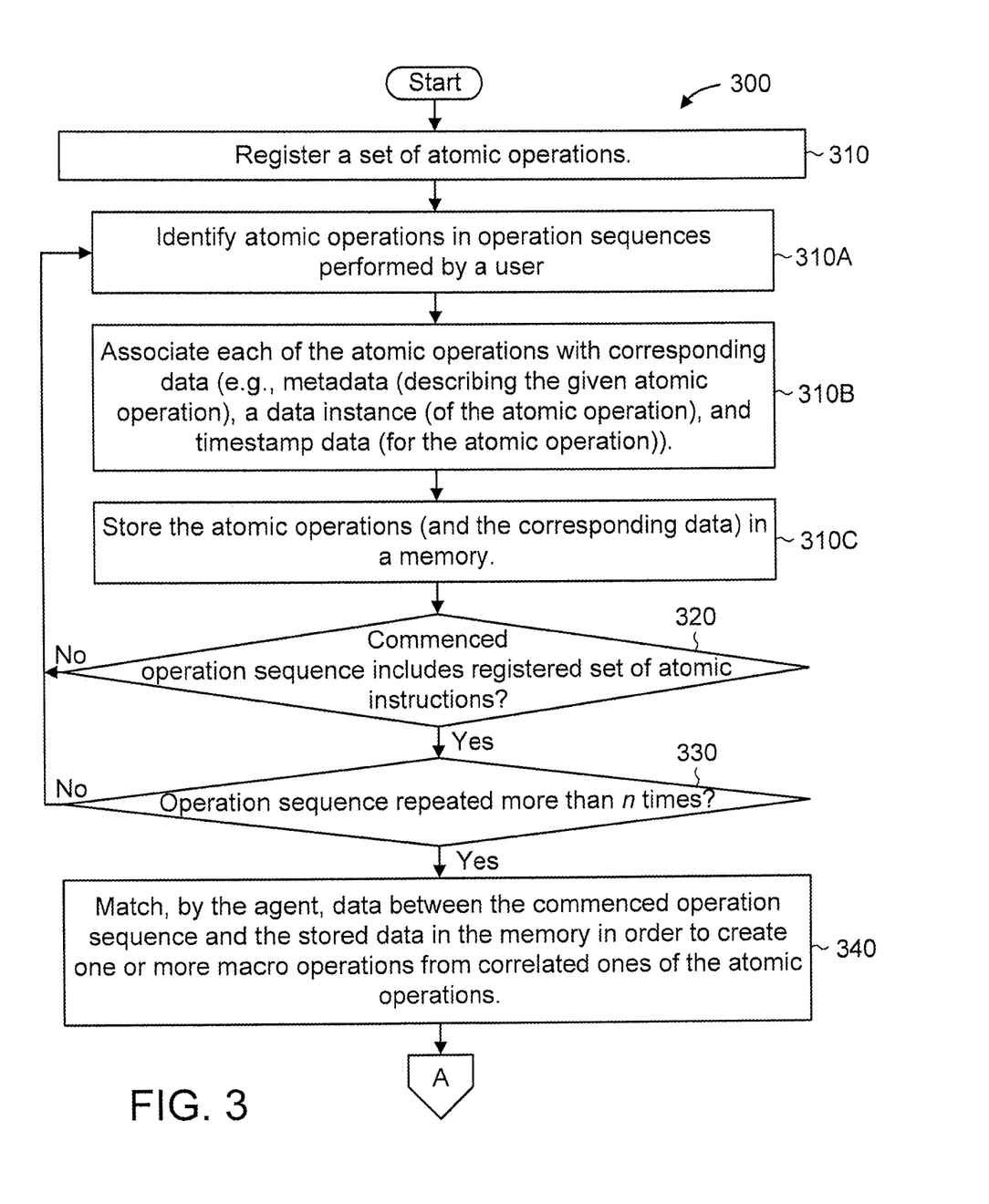
FIGS. 3-5 show an exemplary method for supporting repetitive operations within an operating system, in accordance with an embodiment of the present invention.
Figure 4:
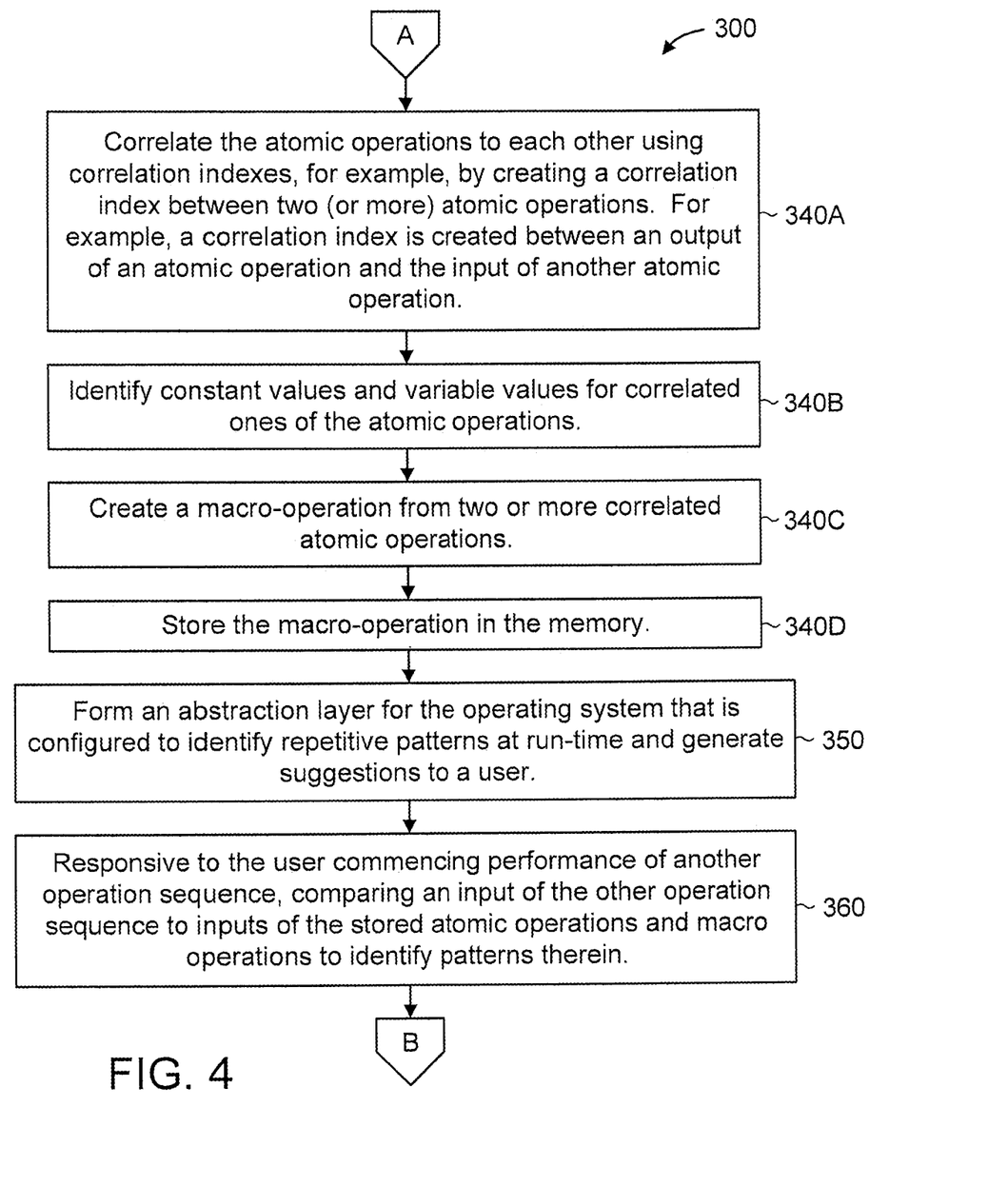
Figure 5:
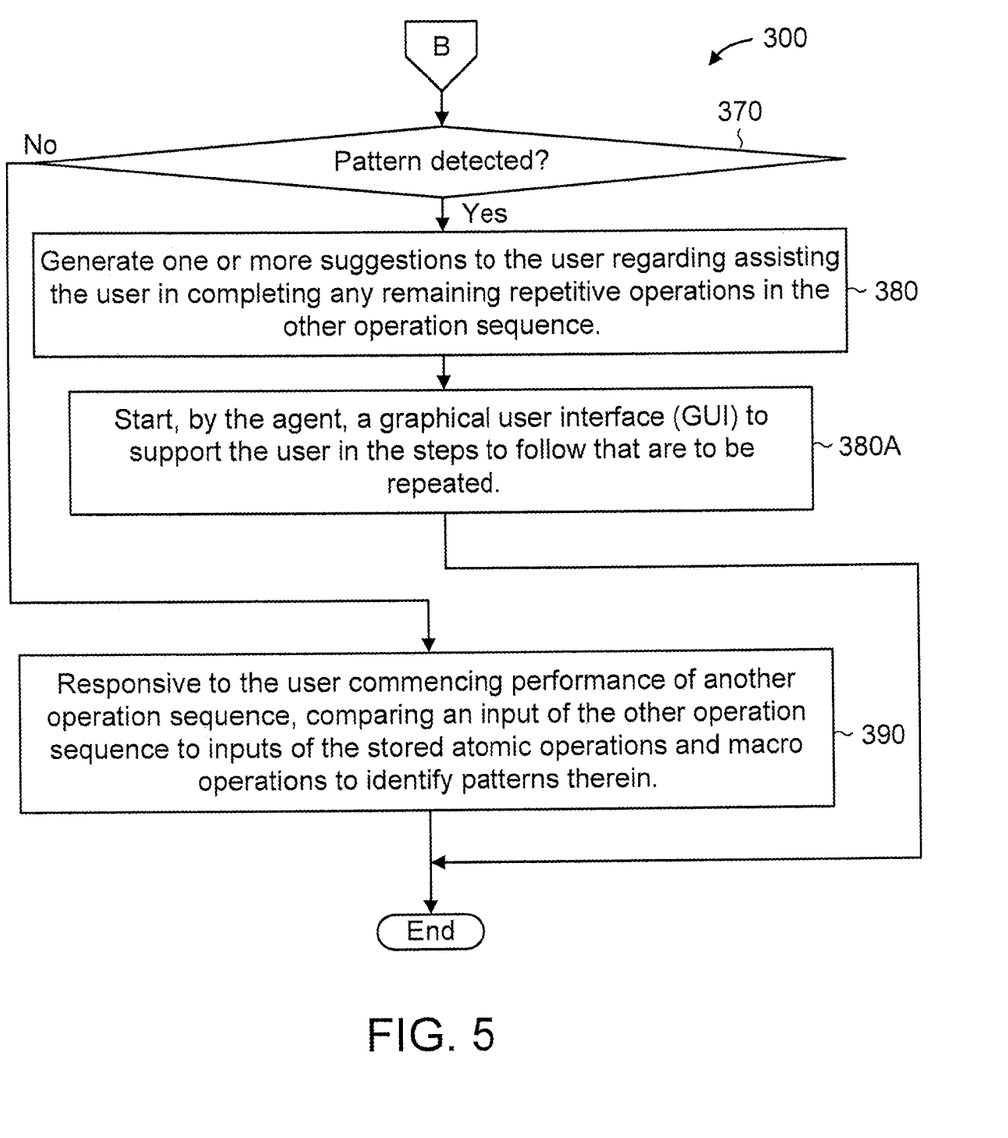

Further, it is to be appreciated that processing system 100 may perform at least part of the methods described herein including, for example, at least part of method 300 of FIGS. 3-5. Similarly, part or all of system 200 may be used to perform at least part of method 300 of FIGS. 3-5.

FIG. 2 shows an exemplary environment 200 to which the present invention can be applied, in accordance with an embodiment of the present invention.

The environment 200 at least includes a set of computer processing systems 210. For the sake of illustration, it is presumed that all of the computer processing systems 210 are used by a common user. The computer processing systems 210 can be any type of computer processing system including, but not limited to, servers, desktops, laptops, tablets, smart phones, media playback devices, and so forth. For the sake of illustration, the computer processing systems 210 include system 210A, system 210B, and system 210C.

In an embodiment, the present invention forms an abstraction layer for an operating system such that the abstraction layer identifies repetitive operations performed by the user and is able to assist the user in completing such repetitive operations.

In an embodiment, the abstraction layer can be formed on one of the computer processing systems (e.g., system 210A) and transmitted to one or more of the other computer processing systems (e.g., systems 210A and 210B). In this way, the present invention can be exploited by all of the computer processing systems used by a particular user. Moreover, as is evident to one of ordinary skill in the art given the teachings of the present invention provided herein, the present invention can be applied to multiple users, while maintaining the spirit of the present invention.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIGS. 3-5 show an exemplary method 300 for supporting repetitive operations within an operating system, in accordance with an embodiment of the present invention.

At step 310, register a set of atomic operations. For the sake of illustration and clarity, a single set of registered atomic operations is described with respect to method 300. However, as readily appreciated by one of ordinary skill in the art given the teachings of the present principles provided herein, the present invention can be readily applied to more than one set of atomic operations, while maintaining the spirit of the present invention.

In an embodiment, step 310 includes steps 310A, 310B, and 310C.

At step 310A, identify atomic operations in operation sequences performed by a user. As is known, an atomic operation is a single step operation that is performed within an operating system and that has an input and an output. Examples of atomic operations include, but are not limited to, a select operation, a copy operation, a paste operation, and so forth.

At step 310B, associate each of the atomic operations with corresponding data. In an embodiment, the corresponding data for a given atomic operation includes metadata (describing the given atomic operation), a data instance (of the atomic operation), and timestamp data (for the atomic operation). In an embodiment, the metadata for a given atomic operation can include identifiers that respectively identify one or more data elements (e.g., but not limited to, text, graphics, etc.) affected by the given atomic operation and/or identifiers that respectively identify one or more objects (e.g., but not limited to, application program, file, etc.) affected by the atomic operations.

At step 310C, store the atomic operations in a memory. For example, the atomic operations can be stored in a data structure such as a graph structure, and so forth. In an embodiment, the graph structure is recursively created/updated as sets of atomic operations are registered. In an embodiment, the metadata, data instance, and timestamp data are stored along with a corresponding atomic operation (see FIG. 6).

Figure 7:
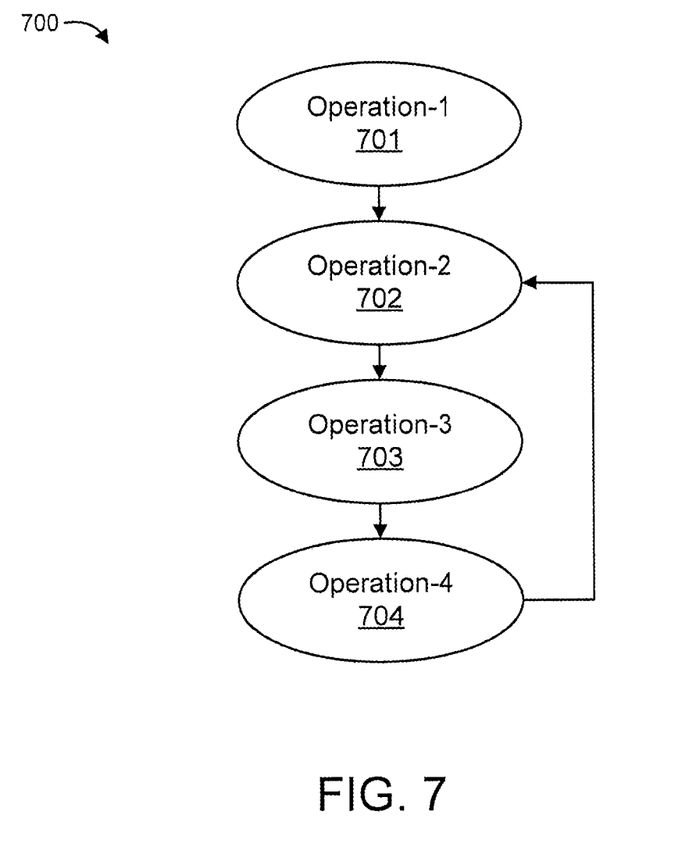
FIG. 7 shows a set of operations to which the present invention can be applied, in accordance with an embodiment of the present invention.

At step 320, responsive to the user commencing performance of an operation sequence, determine whether or not the operation sequence includes the registered set of atomic operations (see FIG. 7). If so, then proceed to step 330. Otherwise, return to step 310A.

At step 330, determine whether the operation sequence, including the registered set of atomic operations, has been repeated more than n times. In an embodiment, n is user configurable. If so, then continue to step 340. Otherwise, return to step 310A.

At step 340, match, by the agent, data between the commenced operation sequence and the stored data in the memory in order to create one or more macro operations from correlated ones of the atomic operations. The data being matched can include, but is not limited to, metadata, instance data, and timestamp data.

In an embodiment, step 340 includes steps 340A, 340B, 340C, and 340D.

At step 340A, correlate the atomic operations to each other using correlation indexes. In an embodiment, a correlation index is created between two (or more) atomic operations. In an embodiment, a correlation index is created between an output of an atomic operation and the input of another atomic operation. For example, a correlation index can be created between an atomic operation to copy a datum and an atomic operation to paste the datum (see FIG. 8). The correlation index can represent, for example, that 95 out of 100 times (that is, 95% of the considered time), a paste operation follows a copy operation. The correlation index can have, for example, a different value for a particular output that often precedes a particular input versus a particular output that often does not precede a particular input. In an embodiment, an overall correlation index can be calculated based on correlation indexes of candidate atomic operations to be included in a macro operation.

At step 340B, identify constant values and variable values for correlated ones of the atomic operations. For example, the constant values and the variable values correspond to inputs and outputs of the atomic operations.

At step 340C, create a macro-operation from two or more correlated atomic operations. In an embodiment, step 340C includes determining an input and an output of the macro-operation. In an embodiment, the macro-operation is recursively created. In an embodiment, the correlation index is used to exclude from a macro-operation all the atomic operations that are not related to a particular sequence repeated (more than n times) by the user. Further relating to the above example involving a paste operation following a copy operation (see FIG. 7), a macro operation can be formed from the copy operation and the paste operation following it.

At step 340D, store the macro-operation in the memory.

At step 350, form an abstraction layer for the operating system that is configured to identify repetitive patterns at run-time and generate suggestions to a user. In an embodiment, the abstraction layer is formed based on the atomic operations and the macro-operation(s), and the data corresponding thereto (e.g., metadata, instance data, timestamp data).

At step 360, responsive to the user commencing performance of another operation sequence, compare an input of the other operation sequence to inputs of the stored atomic operations and macro operations to identify patterns therein.

At step 370, determine whether or not a pattern has been detected. If so, then proceed to step 380. Otherwise, proceed to step 390.

At step 380, generate one or more suggestions to the user regarding assisting the user in completing any remaining repetitive operations in the other operation sequence. The suggestions can be and/or otherwise involve, for example, to allow the computer to automatically perform the remaining repetitive operations in order to remove the burden of doing or initiating the same by the user. In an embodiment, a suggestion can be generated so as to maximize the corresponding correlation index by involving the maximum length of steps (operations) in a suggested macro operation from among a plurality of possible candidate operations.

In an embodiment, step 380 includes step 380A.

At step 380A, start, by the agent, a graphical user interface (GUI) to support the user in the steps to follow that are to be repeated.

At step 390, process the other operation sequence normally (i.e., without suggestions).

In an embodiment, the present invention uses a registration Daemon that is automatically installed on each operating system and that will be responsible for the registration of the operations, repetitive pattern detection and user support.

The agent registered all the operations performed by the user into the system.

The operations are saved with the following information:
operation (e.g., operation name or other identifier);
metadata (describing the operation);
data instance; and
timestamp.

Figure 6:
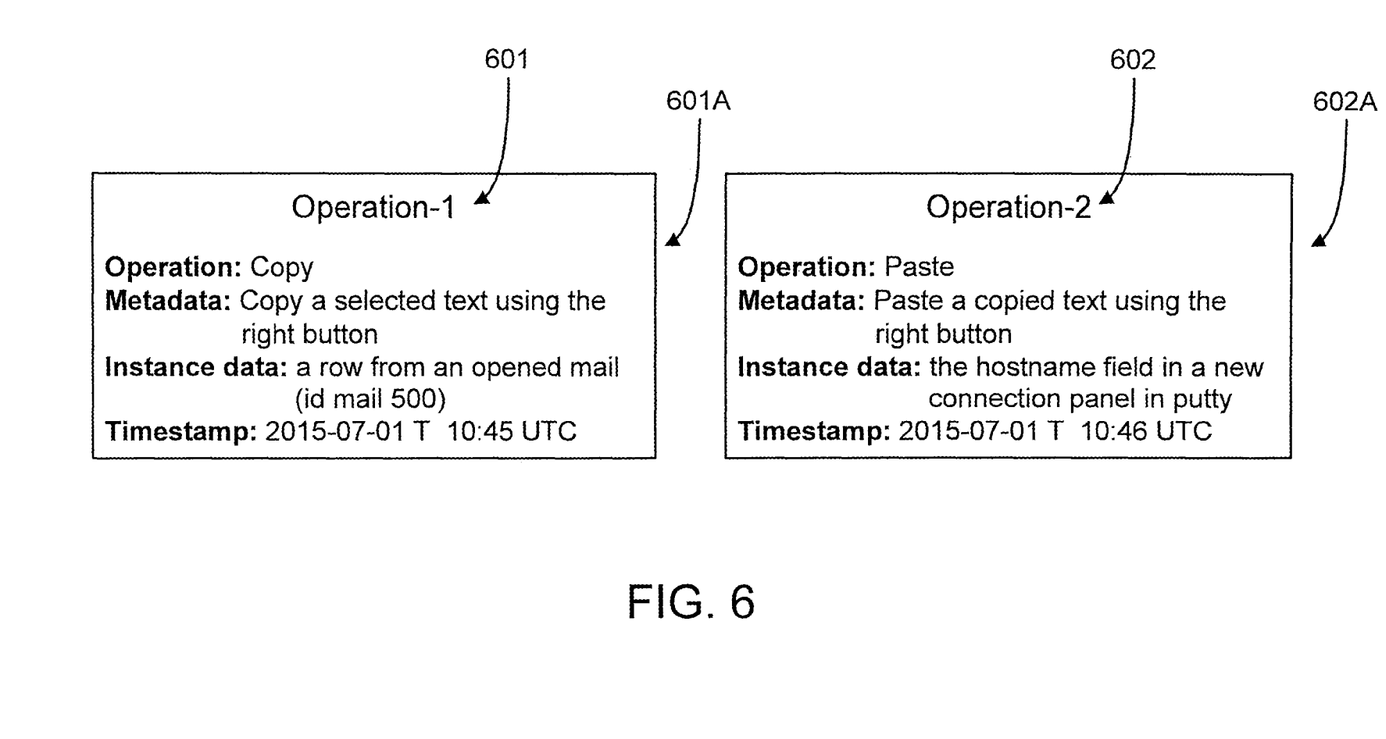
FIG. 6 shows two operations and the information saved with each of the two operations, in accordance with an embodiment of the present invention.

FIG. 6 shows two operations 601 and 602 and the information 601A and 602A saved with each of the two operations, in accordance with an embodiment of the present invention.

The two operations include operation-1 601 and operation-2 602.

Information 601A that is stored for operation-1 601 includes the operation, metadata, instance data, and a timestamp. Information 602A that is stored for operation-2 602 includes the operation, metadata, instance data, and a timestamp. In an embodiment, the FIG. 7 shows a set of operations 700 to which the present invention can be applied, in accordance with an embodiment of the present invention.

The set of operations 700 include an operation-1 701, an operation-2 702, an operation-3 703, and an operation-4 704.

Figure 8:
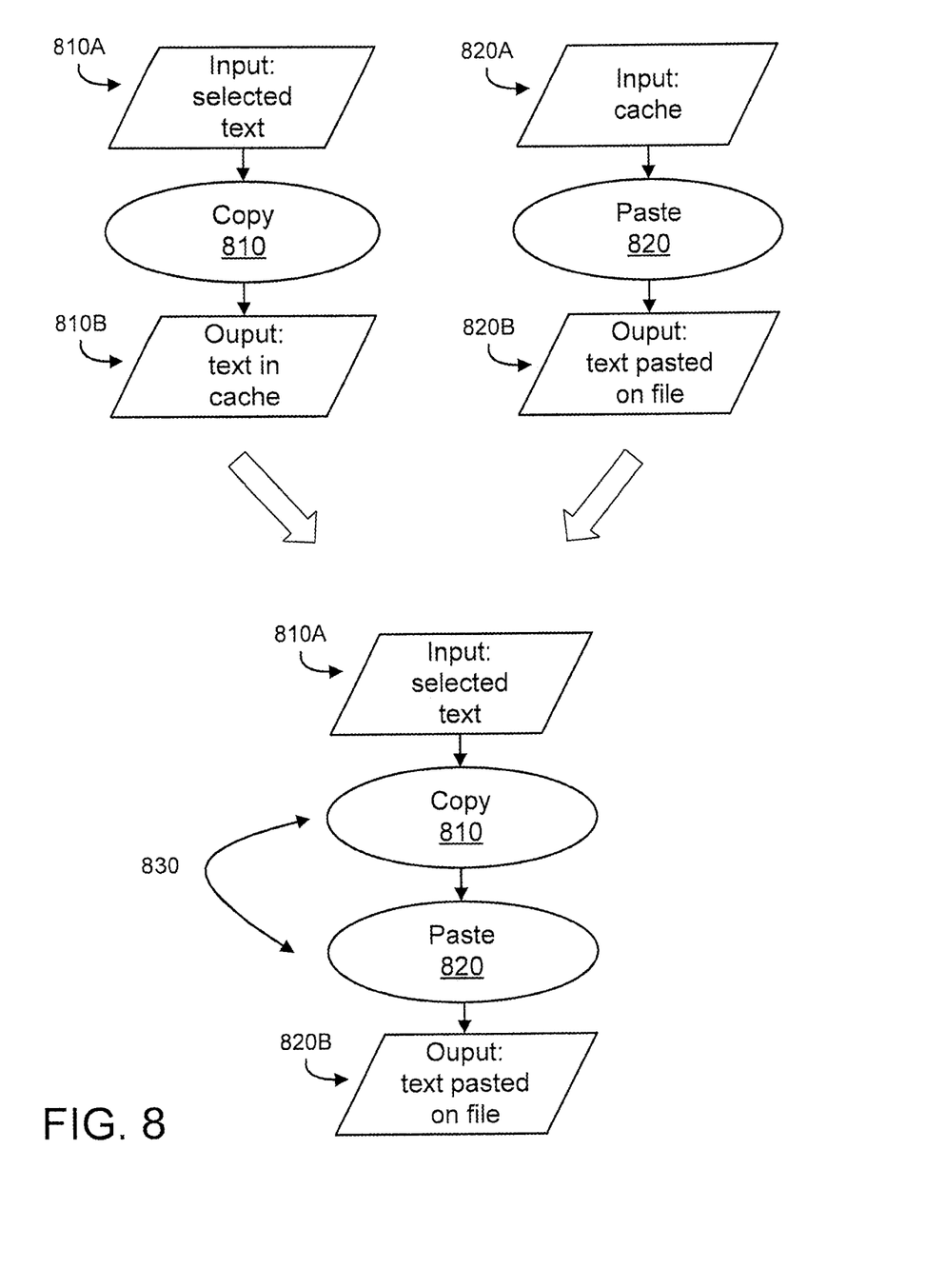
FIG. 8 shows exemplary atomic operations and that are combined into a macro operation, in accordance with an embodiment of the present invention.

FIG. 8 shows exemplary atomic operations 810 and 820 that are combined into a macro operation 830, in accordance with an embodiment of the present invention. In an embodiment, atomic operation 810 can correspond to operation-1 701 in FIG. 7, and atomic operation 820 can correspond to operation-2 702 in FIG. 7.

The copy atomic operation 810 and a paste atomic operation 820 are combined into a macro operation 830. The copy atomic operation 810 has the following input 810A: selected text. The copy atomic operation 810 has the following output 810B: text in cache. The paste atomic operation 820 has the following input 820A: cache. The paste atomic operation 820 has the following output 820B: text pasted on file. The macro operation 830 has the following input 810A: selected text. The macro operation 830 has the following output 820B: text pasted on file. In the example of FIG. 8, the correlation index between the copy and the paste index is 95%, thus resulting in the formation of the macro operation 830 due to the high value for the correlation index. In some cases, a threshold can be used with respect to the correlation to determine if a sufficient degree of correlation is present.

An exemplary scenario will now be described to which the present invention can be applied, in accordance with an embodiment of the present invention.

An IT developer (hereinafter "user"), after receiving a mail with a list of hosts, creates a new connection for each host using an application to manage the connection. Thus, the user repeats the following operations for each host:

1. In the connection application, create a new connection;
2. From the mail, copy a hostname for the host;
3. Paste the hostname in the connection details panel;
4. Repeat steps 2 and 3 for the user name and password; and
5. Save the connection.

The agents registered the following operations (with the bold text used to highlight the differences between the metadata):

Operation 1: Copy the first column from the first row from mail (id 444)
Operation 2: Create a new connection in putty
Operation 3: Paste the text into the field hostname
Operation 4: Copy the second column from the first row from mail (id 444)
Operation 5: Paste the text into the field username
Operation 6: Save the connection
Operation 1: Copy the first column from the second row from mail (id 444)
Operation 2: Create a new connection in putty
Operation 3: Paste the text into the field hostname
Operation 4: Copy the second column from the second row from mail (id 444)
Operation 5: Paste the text into the field username
Operation 6: Save the connection The agent recognizes that the operation of copy, create, paste, copy, paste and save have been repeated and tries to match the metadata. The only difference between the metadata is the row of the mail. The row value increased in an incremental way (from "first" to "second") so the system prompts the user with an offer to repeat these operations automatically for the next n rows of the mail.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method, comprising:
identifying, by a processor, atomic operations within a sequence of data elements and metadata associated with the atomic operations, the sequence of data elements related to an interaction between a user and a user interface of a computer system that includes the processor;
calculating, by the processor, correlation indexes from the metadata, wherein a respective correlation index is calculated for various atomic operation groups formed from the atomic operations; and
identifying, by the processor, a macro operation from at least one of the correlation indexes, the macro operation including multiple correlated atomic operations from among the atomic operations identified within the sequence,
wherein at least some of the correlation indexes are calculated between an output of a respective one of atomic operations and an input of another respective one of the atomic operations.

2. The computer-implemented method of claim 1, wherein the atomic operations include data movement operations, and wherein the metadata associated with the atomic operations comprises one or more data elements to be moved by the data movement operations.

3. The computer-implemented method of claim 2, wherein the correlation index is calculated based on a percentage of occurrence of the atomic operations that relate to same ones of the one or more data elements from among all of the atomic operations.

4. The computer-implemented method of claim 1, wherein the metadata associated with the atomic operations comprises one or more identifiers that respectively identify one or more objects affected by the atomic operations.

5. The computer-implemented method of claim 4, wherein the correlation index is calculated based on a percentage of occurrence of the atomic operations that relate to same ones of the one or more objects from among all of the atomic operations.

6. The computer-implemented method of claim 1, wherein identifying the macro operation comprises calculating an overall correlation index based on the correlation indexes of candidate atomic operations to be included in the macro operation.

7. The computer-implemented method of claim 1, wherein the at least one of the correlation indexes comprises a plurality of correlation indexes, and wherein the identified macro operation is identified based on a largest one of the at least one of the correlation indexes.

8. The computer-implemented method of claim 1, wherein the macro operation is identified as a candidate macro operation that includes a largest number of atomic operations from among a set of candidate macro operations.

9. The computer-implemented method of claim 1, further comprising:
   forming an abstraction layer for an operating system of the computer system based on the atomic operations and the macro operation; and
   detecting patterns in a given operation sequence relative to the atomic operations and the macro operation, using the abstraction layer.

10. The computer-implemented method of claim 1, further comprising storing each of the atomic operations in a memory of the computer system, wherein for a given atomic operation, the atomic operation is stored along with metadata describing the given atomic operation, a data instance for the given atomic operation, and timestamp data for the given atomic operation.

11. The computer-implemented method of claim 1, further comprising automatically completing any remaining operations in the given operation sequence, responsive to detecting a match between data relating to the given operation sequence and data relating to any of the atomic operations and the macro operation.

12. The computer-implemented method of claim 1, wherein the data relating to the given operation sequence and data relating to any of the atomic operations and the macro operation comprises metadata.

13. A computer program product for operation management, the computer program product comprising a computer readable storage medium having program instructions embodied therewith, the program instructions executable by a computer to cause the computer to perform a method comprising:
   identifying, by a processor of the computer, atomic operations within a sequence of data elements and metadata associated with the atomic operations, the sequence of data elements related to an interaction between a user and a user interface of the computer;
   calculating, by the processor, correlation indexes from the metadata, wherein a respective correlation index is calculated for various atomic operation groups formed from the atomic operations; and
   identifying, by the processor, a macro operation from at least one of the correlation indexes, the macro operation including multiple correlated atomic operations from among the atomic operations identified within the sequence,
   wherein at least some of the correlation indexes are calculated between an output of a respective one of atomic operations and an input of another respective one of the atomic operations.

14. The computer program product of claim 13, wherein the at least one of the correlation indexes comprises a plurality of correlation indexes, and wherein the identified macro operation is identified based on a largest one of the at least one of the correlation indexes.

15. The computer program product of claim 13, wherein the method further comprises:
   forming an abstraction layer for an operating system of the computer system based on the atomic operations and the macro operation; and
   detecting patterns in a given operation sequence relative to the atomic operations and the macro operation, using the abstraction layer.

16. The computer program product of claim 13, wherein the method further comprises storing each of the atomic operations in a memory of the computer system, wherein for a given atomic operation, the atomic operation is stored along with metadata describing the given atomic operation, a data instance for the given atomic operation, and timestamp data for the given atomic operation.

17. The computer program product of claim 13, wherein the method further comprises automatically completing any remaining operations in the given operation sequence, responsive to detecting a match between data relating to the given operation sequence and data relating to any of the atomic operations and the macro operation.

18. A computer processing system, comprising:
   a processor, configured to:
      identify atomic operations within a sequence of data elements and metadata associated with the atomic operations, the sequence of data elements being related to an interaction between a user and a user interface of a computer system that includes the processor;
      calculate correlation indexes from the metadata, wherein a respective correlation index is calculated for various atomic operation groups formed from the atomic operations; and
      identify a macro operation from at least one of the correlation indexes, the macro operation including multiple correlated atomic operations from among the atomic operations identified within the sequence,
      wherein at least some of the correlation indexes are calculated between an output of a respective one of atomic operations and an input of another respective one of the atomic operations.

* * * * *